(12) United States Patent
Macy et al.

(10) Patent No.: US 11,162,518 B1
(45) Date of Patent: Nov. 2, 2021

(54) RAIL CLAMP ASSEMBLY

(71) Applicants: Preston R. Macy, Holyoke, MA (US);
David Moore, Hampden, MA (US);
David Bozek, Holyoke, MA (US)

(72) Inventors: Preston R. Macy, Holyoke, MA (US);
David Moore, Hampden, MA (US);
David Bozek, Holyoke, MA (US)

( * ) Notice: Subject to any disclaimer, the term of this patent is extended or adjusted under 35 U.S.C. 154(b) by 148 days.

(21) Appl. No.: 16/804,193

(22) Filed: Feb. 28, 2020

(51) Int. Cl.
*F41G 11/00* (2006.01)
*F16B 2/06* (2006.01)

(52) U.S. Cl.
CPC ............ *F16B 2/065* (2013.01); *F41G 11/003* (2013.01)

(58) Field of Classification Search
CPC .......... F41G 11/003; F41G 1/38; F41G 1/387; F41G 1/393; F41G 1/3935; F41G 1/41; F41G 11/00; F41G 11/001; F41G 11/005
USPC ....................... 42/90, 119, 124–127, 111–114
See application file for complete search history.

(56) References Cited

U.S. PATENT DOCUMENTS

| | | | |
|---|---|---|---|
| 2,663,083 A | 12/1953 | Harms | |
| 2,905,427 A | 9/1959 | Roeder | |
| 3,295,811 A | 1/1967 | Giwosky | |
| 5,144,752 A | 9/1992 | Boeke | |
| 7,647,720 B1 | 1/2010 | Vanasn | |
| 7,685,759 B2 | 3/2010 | Teetzel | |
| 7,814,698 B2 | 10/2010 | Fluhr | |
| 8,336,247 B2 | 12/2012 | Haering | |
| 8,387,294 B2 * | 3/2013 | Bolden | F41C 27/00 42/1.01 |
| 8,667,727 B2 | 3/2014 | Engelhardt | |
| 8,683,732 B2 * | 4/2014 | Joplin | F41G 11/003 42/124 |
| 8,827,219 B2 | 9/2014 | Kessler | |
| 8,893,424 B2 | 11/2014 | Haering | |
| 9,395,158 B2 | 7/2016 | Collin | |
| 2013/0008071 A1 | 1/2013 | Haering | |
| 2013/0283663 A1 * | 10/2013 | Joplin | F41G 11/003 42/124 |
| 2015/0241174 A1 | 8/2015 | Silvennoinen | |

* cited by examiner

*Primary Examiner* — Jonathan C Weber
(74) *Attorney, Agent, or Firm* — Doherty, Wallace, Pillsbury & Murphy, P.C.

(57) ABSTRACT

A rail clamp assembly that improves the mechanisms whereby a rail is secured to the rail clamp assembly comprising a mounting base having a diagonally and generally elliptical-shaped channel formed therethrough and further comprising a clamp member. The clamp member has a diagonally formed throughway formed therethrough. The clamp member is received by the mounting base such that the throughway of the clamp member is aligned with the channel. The clamp member further comprises a protrusion which is received within a slot of the rail and the mounting base comprises a protrusion which is received within an adjacently situated slot of the rail. A side wall of the mounting base and an inclined surface of a flange of the clamp member are configured to engage with an inclined surface of the rail to further secure the rail to the assembly.

13 Claims, 17 Drawing Sheets

PRIOR ART

RAIL CLAMP ASSEMBLY

BACKGROUND OF THE INVENTION

1. Field of the Invention

The present disclosure relates to a rail clamp assembly for attachment to a firearm mounting rail system such as a NATO accessory rail commonly referred to as the STANAG 4694, or a floating rail structure of a type commonly attached to a military firearm for attaching optical scopes, thermal or laser sights, tactical flashlights, vertically extending handgrips, or other weapon-mounted accessories.

2. Background of the Invention

It is often useful to mount an accessory device, such as a light beam generator, to a rail that may be secured to or otherwise carried by a gun. When the rail is carried by a gun, it is of utmost importance that the mounting apparatus, which interfaces the accessory device and the rail, be firmly clamped or otherwise firmly secured to the rail, while at the same time it is desirable that the rail clamp mount be quickly and easily securable to and removable from the rail.

The current military standard for clamping accessories onto a tactical rail is a NATO accessory rail 10 identified as the STANAG 4694 rail, the specifications of which are depicted in FIG. 1. When attaching a conventionally known rail clamp to the STANAG 4694 rail, the contact/clamping points are limited to a horizontal plane, which limits the clamps ability to secure an accessory to the rail. Adding additional clamping perpendicular to the impact force of the firearm's firing would enhance the securement of the rail clamp to the tactical rail.

When attaching a conventionally known rail clamp to a conventionally known STANAG 4694 rail, which is depicted in FIGS. 1 and 2, a contact point is created along a horizontal plane between the rail clamp and a lower distal inclined surface 14 of rail 10, and a contact point is created along a horizontal plane between the rail clamp and a lower proximal inclined surface 16. The contact/clamping points are in a horizontal plane and are, therefore, perpendicular to the impact force of the firearm. As the prior art mounting clamp only clamps horizontally, adding additional clamping perpendicular to the impact force of the firearm's firing would enhance the securement of the rail clamp to the tactical rail.

SUMMARY OF THE INVENTION

The rail clamp assembly disclosed herein overcomes the deficiencies of the prior art and provides a means whereby the number of directional forces asserted against the castellation of a rail is increased to thereby more fully secure the rail to the rail clamp assembly.

In an exemplary embodiment, the rail clamp assembly comprises a subassembly including a clamp member and a mounting base. The rail clamp assembly may include one or more subassemblies, wherein in an especially preferred embodiment the rail clamp assembly includes one or two subassemblies.

In an exemplary embodiment, the mounting base of the assembly comprises a protrusion which fits into a slot of a rail, and the clamp member, which is fitted on the mounting base, is drawn by a screw such that the drawing action pulls the subassembly down onto the rail, across engaging the angled sides of the rail, and forward into the protrusion thereby trapping the rail castellation between the protrusion and the clamp member. This is accomplished, due to the improvements described here, when the machined parts are within tolerance. The improvement is a stronger and more shock tolerant mechanism on parts made to commercial tolerances.

The clamp mechanism described works as designed in cases where two or more subassemblies are desired, and where the commercial tolerances are more extreme. The assembly achieves the downward, crosswise, and forward clamping engagements that produce a superior clamping performance on commercially produced components, such as a rail.

The rail clamp assembly disclosed herein overcomes the deficiencies of the prior art and includes a mounting base and a pair of clamp members. In an exemplary embodiment, each of the clamp members comprises a protrusion each of which is received within a separate slot of a rail, wherein the slots are separated from one another by a plurality of ribs formed on the rail.

The clamp members are received by the mounting base, wherein, in an exemplary embodiment, the mounting base comprises a protrusion which is received within a slot on the rail which is preferably immediately adjacently situated to the slot of the rail which receives the protrusion from one of the clamp members. In an exemplary embodiment, a screw is positioned through a throughway formed through a side body of one of the clamp members and through a first channel formed through the mounting base, and another screw is positioned through a throughway formed through a side body of the other clamp member and through a second channel formed through the mounting base to thereby secure the clamp members to the mounting base. In an exemplary embodiment, the first and the second channels and the throughways of the clamp members are diagonally formed so that the screws are inserted diagonally through the mounting base and the clamp members to further increase the force by which the clamp members and the mounting base are joined to the rail.

In an exemplary embodiment, a rail clamp assembly which attaches to a tactical rail for a firearm comprises a mounting base, a first clamp member, and a second clamp member. In an exemplary embodiment, the mounting base comprises a longitudinally extending inner surface oppositely situated to a longitudinally extending upper surface wherein each of the inner and upper surfaces has a first terminal end oppositely situated to a second terminal end; a longitudinally extending distal side wall contiguously and transversely formed with the first terminal ends, wherein the distal side wall has a rail gripping portion that extends from and overhangs the inner surface, wherein the rail gripping portion is configured to receive the distal inclined surface of the rail, and further wherein the distal side wall comprises a first opening and a second opening, wherein each of the first and the second openings are formed through the distal side wall at a position between the inner surface and the upper surface; and a longitudinally extending proximal side wall contiguously and transversely formed with the second terminal ends of the upper surface and the inner surface, wherein the proximal side wall is oppositely formed to the distal side wall. In an exemplary embodiment, the mounting base further comprises a first and a second slot, wherein each of the first and second slots are formed through the proximal side wall and extend through the inner surface to respectively form a first intermediate wall and a second intermediate wall and a first abutment wall and a second abutment wall, wherein the first and the second intermediate walls are disposed between the inner surface and the upper surface and are substantially parallel thereto, and wherein the first and the second abutment walls are respectively contiguously formed with and located transversely to the first and the second intermediate walls and are contiguously formed with and located transversely to the inner surface, and further wherein the first and the second abutment walls respectively has a first and a second opening formed thereon. In an exemplary embodiment, the mounting base further comprises a first and a second diagonally formed channel each of which is formed between the inner surface and the upper surface, wherein the first channel is in fluid communication with the first opening of the first abutment wall and with the first opening of the distal side wall, and the second channel is in fluid communication with the second opening of the second abutment wall and with the second opening of the distal side wall. In an exemplary embodiment, the mounting base further comprises a protrusion formed on the inner surface and located adjacently to the first slot.

In an exemplary embodiment, the assembly further comprises a first clamp member and a second clamp member, wherein in an exemplary embodiment each of the first and the second clamp members comprises: a proximal directed face comprising a first lateral side wall oppositely situated to a second lateral side wall and a lower edge oppositely situated to an upper edge; a side body contiguously formed with and transversely located to the first and the second lateral walls of the proximal directed face; a lower wall contiguously formed with and transversely located to the lower edge of the proximal directed face, wherein a groove is formed through the lower wall of the respective first and second clamp members, to form a protrusion which is bordered by a recessed wall; and a channel diagonally formed through the side body, wherein the channel extends from an opening formed on the side body of the clamp member and through an opening formed through the proximal directed face.

In an exemplary embodiment, the first clamp member is positioned within the first slot of the mounting base and the second clamp member is positioned within the second slot of the mounting base such that the opening on the side body of the first clamp member is aligned with the first opening of the distal side wall and the opening on the side body of the second clamp member is aligned with the second opening of the distal side wall, and wherein the protrusion of the first clamp member is positioned within a slot of the rail.

In an exemplary embodiment, the rail clamp assembly may be used on a sight base (or other accessory) for the purpose of decreasing a length of the sight (or other accessory) on the axis of the tactical rail. Additionally, the rail clamp assembly may be used for clamping any accessory on a tactical rail, wherein such accessories may include, for example and without limitation, a flashlight, a rifle scope, a pistol grip, a sling mount, and the like.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
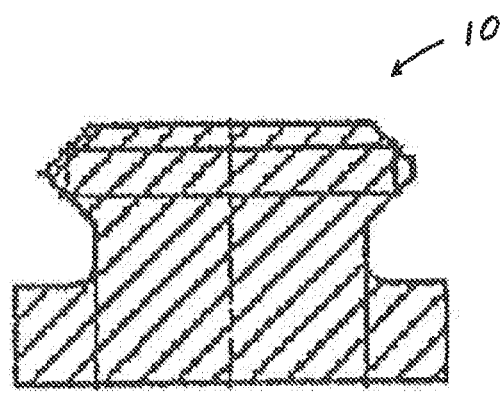
FIG. 1 is a schematic depicting a cross-sectional view of a prior art NATO Accessory Rail STANAG 4694.
Figure 2:
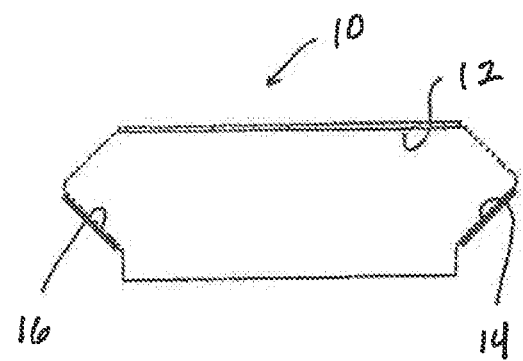
FIG. 2 is a schematic depicting contact points of the prior art NATO Accessory Rail STANAG 4694.
Figure 3:
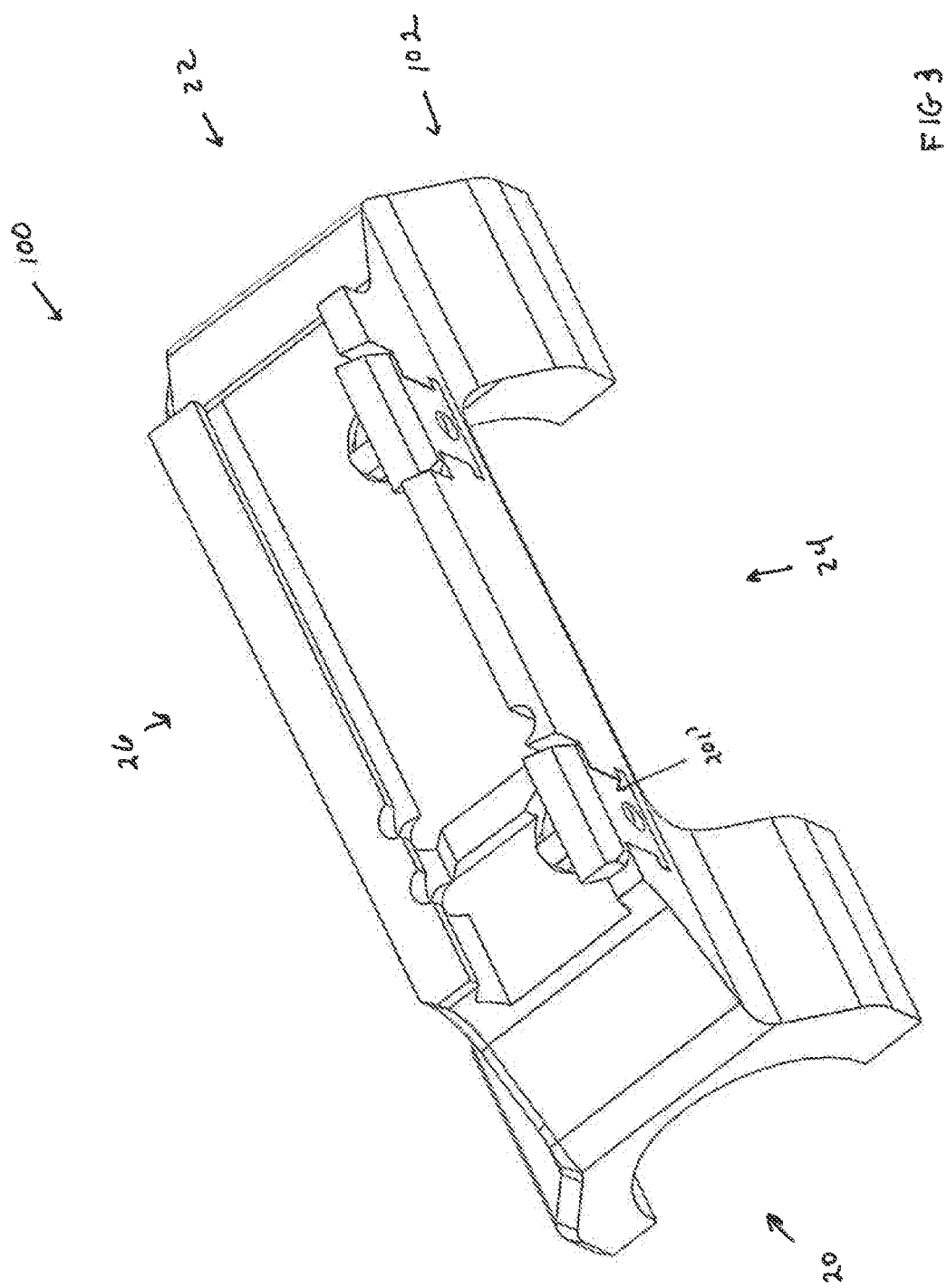
FIG. 3 is a schematic depicting an elevational view of a proximal side of an exemplary rail clamp assembly.
Figure 4:
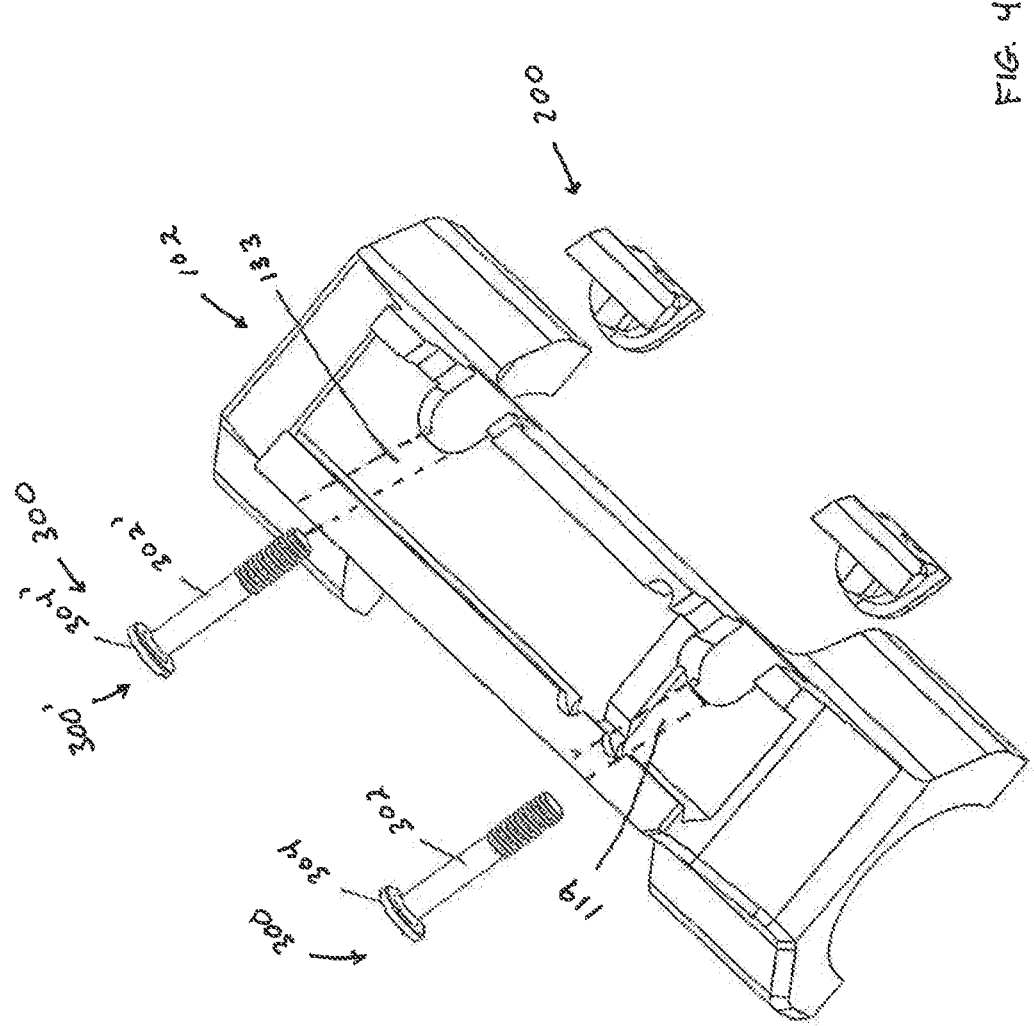
FIG. 4 is a schematic depicting an elevational view of the proximal side of the rail clamp assembly depicted in FIG. 3, wherein the clamp members and the screws are detached from the mounting base.
Figure 5:
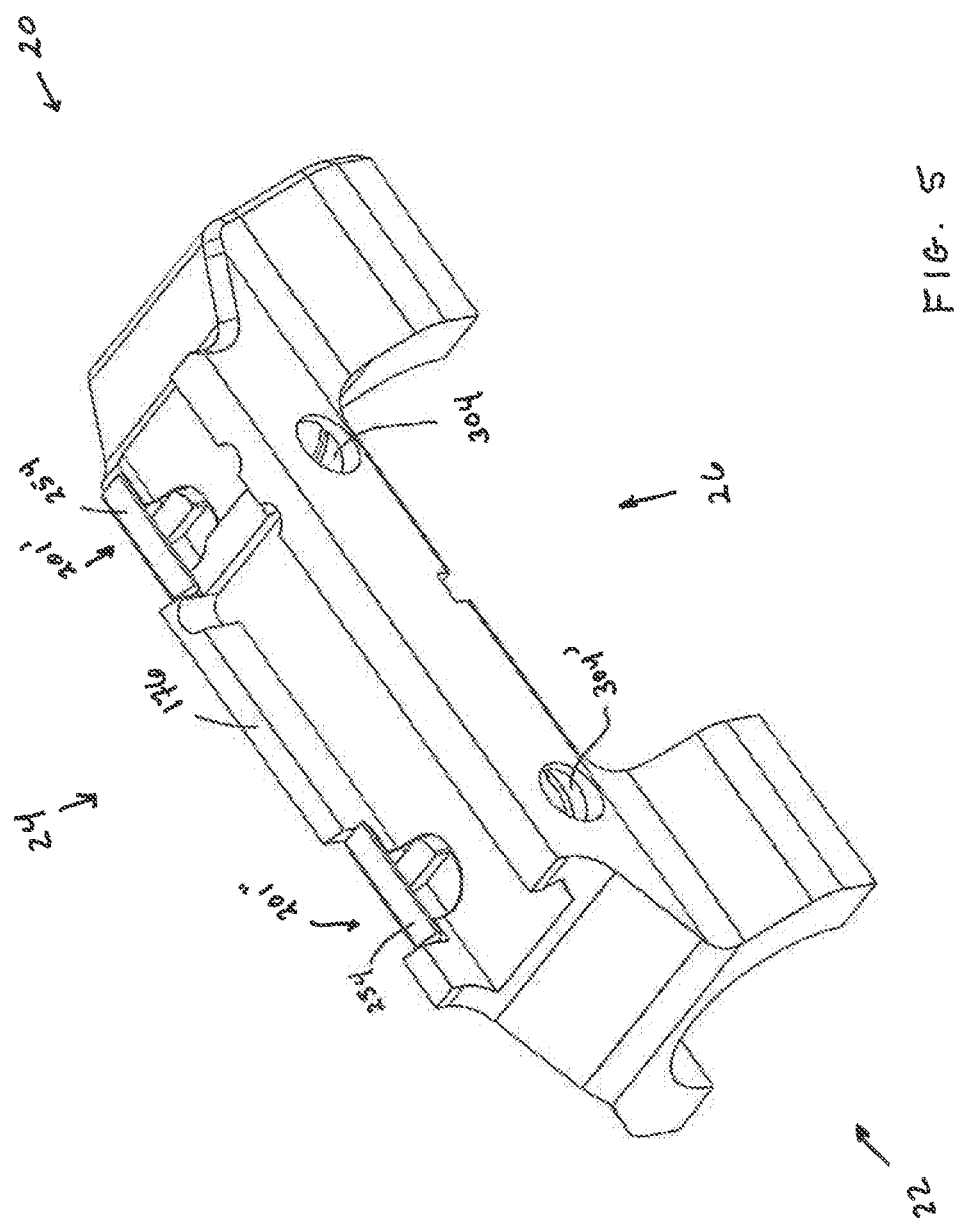
FIG. 5 is a schematic depicting an elevational view of a distal side of the rail clamp assembly depicted in FIG. 3.
Figure 6:
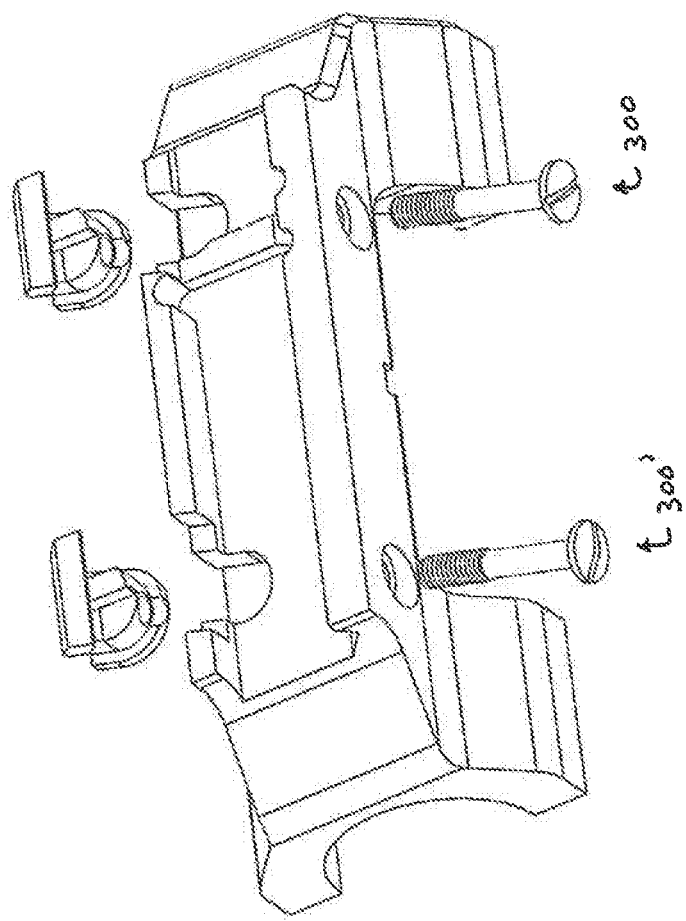
FIG. 6 is a schematic depicting an elevational view of the distal side of the rail clamp assembly depicted in FIG. 5, wherein the clamp members and the screws are detached from the mounting base.

Disclosed herein is a rail clamp assembly comprising one or more rail clamp subassemblies, wherein the subassemblies comprises a clamp member and a mounting base which are specially configured for removable attachment to a tactical rail, wherein an especially preferred tactical rail includes a STANAG 4694 rail such as that depicted as reference number 10 in FIGS. 1 and 2. It is herein noted that, although the inventive rail clamp subassembly is discussed in relation to its use on or in association with a STANAG 4694 rail, its use is not so limited. Rather, it may be modified to be used on a variety of tactical rails either currently known or those to be developed in the future.

Figure 17:
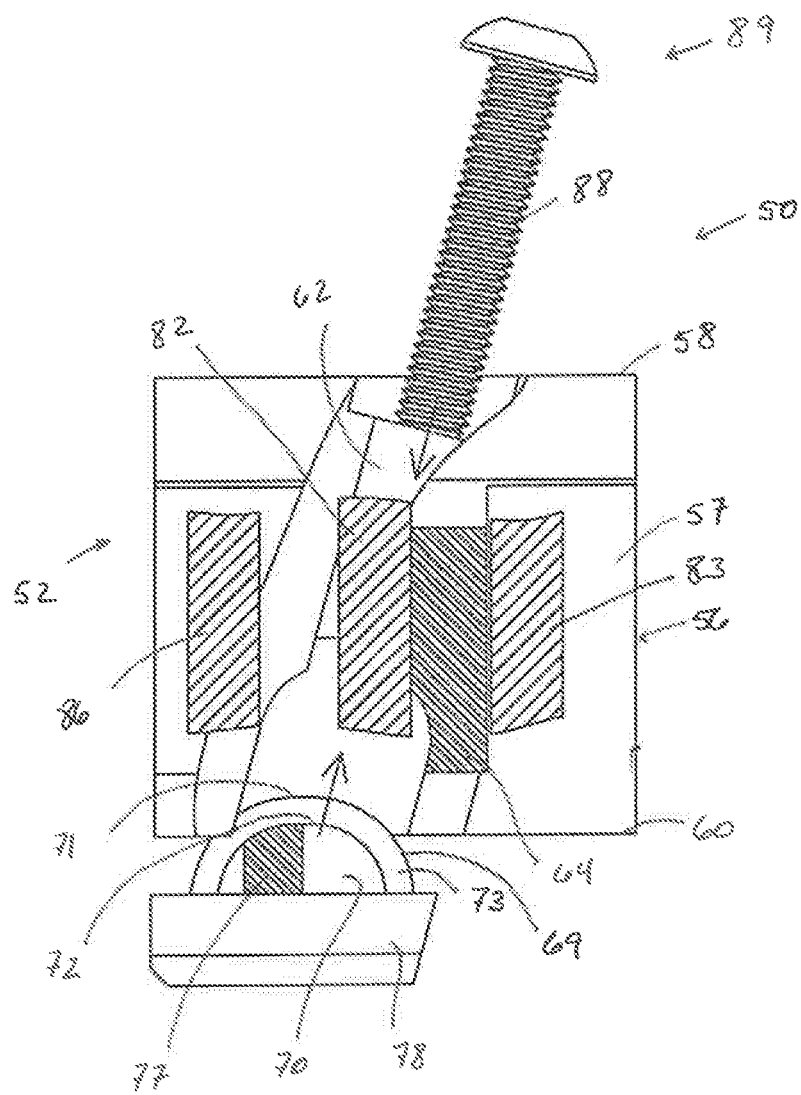
FIG. 17 is a schematic depicting an exemplary clamping subassembly and a portion of an exemplary rail.

An exemplary rail clamp subassembly 50 is depicted in FIG. 17. Subassembly 50 comprises a mounting base 52 and a clamp member 54. Mounting base 52 comprises a plate 56 having a distal side wall 58 oppositely situated to a proximal side wall 60. A generally elliptical shaped cavity 62 is formed through an inner surface 57 of plate 56 such that cavity 62 extends from distal side wall 58 to proximal side wall 60. Mounting base 52 further comprises a protrusion 64 integrally formed with and extending from inner surface 57, wherein in an exemplary embodiment, protrusion 64 terminates at proximal side wall 60 and is coterminous with through hole 62.

Clamp member 54 comprises a body 67 which has a front face 68, a foot member 69 and a base member 70. Each of foot member 69 and base member 70 has a respective apex 71 and 72. Base member 70 is integrally formed with foot member 69 such that apex 72 faces the same direction as apex 71, and further wherein base member 70 is recessed relative to foot member 69 to thereby form a shelf region 73. A throughole 74 is formed through apex 72 and a diagonally formed chamber 76 extends from throughole 74 to front face 68. A protrusion 77 is formed on base member 70. Clamp member 54 further comprises a flange 78 which is contiguously formed with front face 68 and which overhangs foot member 69 and base member 70 such that base member 70 is disposed between foot member 69 and flange 78 and such that protrusion 77 is directed towards flange 78.

When subassembly 50 is attached to a rail, a surface 90 of foot member 69 rests within cavity 62 such that front face 68 is directed towards proximal side wall 60 of mounting base 52 and such that apexes 71 and 72 of clamp member 54 are directed towards distal side wall 58 of mounting base 52. Protrusion 64 of mounting base 52 is positioned into a slot 80 formed between adjacent ribs 82 and 83 of the rail while protrusion 77 of clamp member 54 is positioned within a slot 85 formed between adjacent ribs 82 and 86 of the rail. A shaft 88 of a screw 89 is disposed within cavity 62, wherein shaft 88 extends into throughole 74 of foot member 69.

Figure 18:
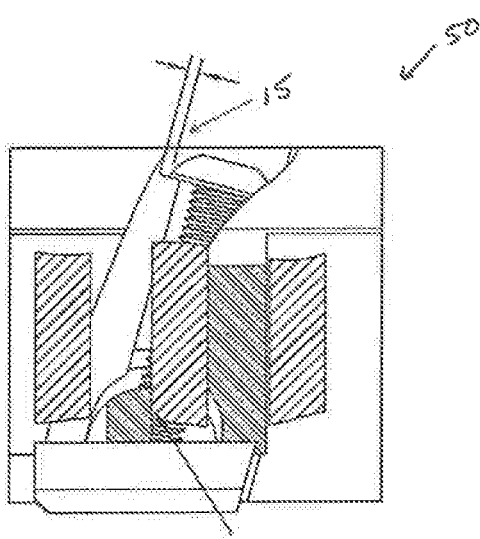
FIG. 18 is a schematic depicting the clamping subassembly depicted in FIG. 17 which depicts a gap 15 at nominal closure between the screw head and a side wall of a cavity and which shows initial compression at nominal contact.
Figure 19:
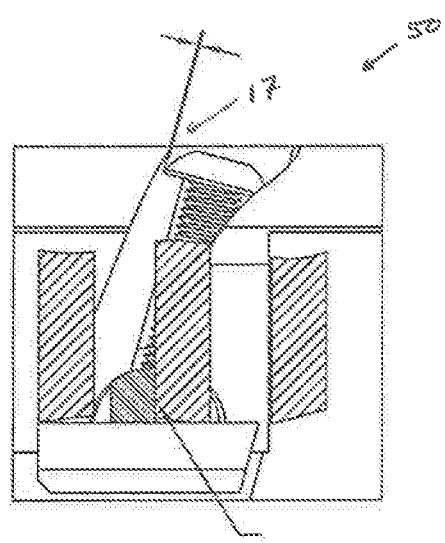
FIG. 19 is a schematic depicting the clamping assembly depicted in FIG. 17 which depicts a gap 17 at full closure between the screw head and the side wall of the cavity and which is at a maximum compression at full closure.

Referring to FIGS. 18 and 19, and as stated above, clamp member 54 is received by mounting base 52, wherein, in an exemplary embodiment, mounting base 52 comprises protrusion 64 which is received within a slot on the rail which is preferably immediately adjacently situated to the slot of the rail which receives protrusion 72 from clamp member 54. Screw 89 is positioned through a throughway formed through a side body of one of the clamp members and through a first channel or cavity formed through mounting base 52.

This arrangement causes the moving clamp member 52 to be pulled into contact with the rail as screw 89 is tightened. The draw across is at an angle so that a clamping force is applied to both the angular side of the rail and to the castellation that is opposite the protrusion. The dual clamping action causes this attachment to be more secure and not subject to movement when shock and acceleration is encountered such as when a round is fired in a firearm.

The drawing action by the screw needs to accommodate the exact size of the rail assembly, since machining and other errors can introduce dimensions different from the ideal. In an exemplary embodiment, then, the portion of the cavity formed in the mounting base which receives the screw comprises an oversized, elliptical-shaped cavity such that the screw can move to adjust for these errors and that is a key element of the functional design of the clamp subassembly.

One accommodation is that the screw translates within the through hole so that the moving clamp member can engage a rail in any of the allowed specified dimensional errors and create a strong clamping force in both the lateral and longitudinal directions while simultaneously pulling the clamp onto the rail surface.

Another accommodation is that the screw can pivot within the through hole so that the moving clamp member can fully engage even if the engagement surfaces are not at right angles. Any angle other than a right angle will stress the drawing screw unless the screw can align with the needed accommodation in the clamp or rail machined dimensions. Errors due to common machining practices are to be found here as well and the shape of the screw-receiving portion of the cavity is also beneficial for this accommodation.

The elliptical-shaped cavity is also important for the successful use of two or more clamping subassemblies that are mounted to a single metal part. For example, often optic mounts use two clamps separated by many castellation's. This arrangement usually results in a more extreme or exaggerated dimensional tolerance that must be allowed for. The oversized elliptical draw screw through hole serves to make this accommodation. The clamp member is drawn at an angle such that it clamps securely in the lateral and longitudinal axis and it also drawn onto the plane of the rail.

Figure 20:
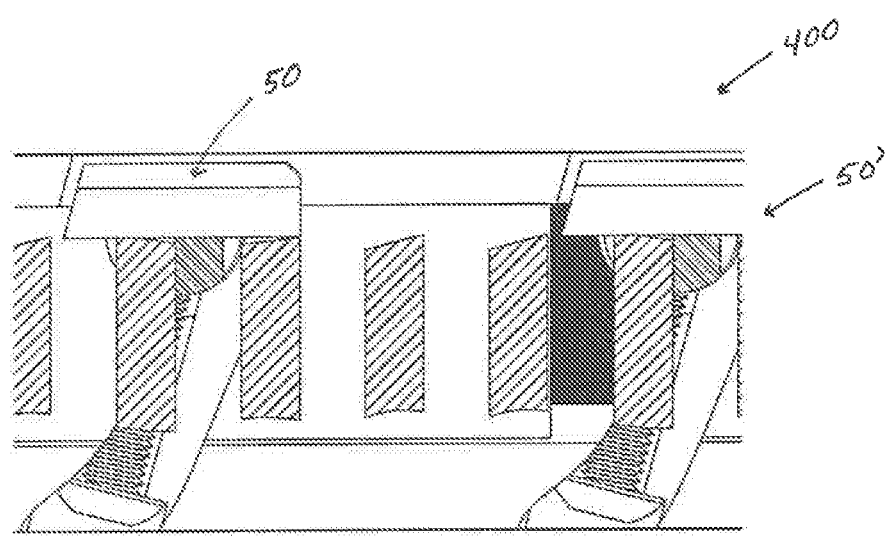
FIG. 20 is a schematic depicting another exemplary clamp assembly comprising two exemplary clamp subassemblies.

Referring to FIG. 20, rail clamp assembly 400 comprises rail clamp subassembly 50 and rail clamp subassembly 50' wherein subassemblies 50 and 50' are identical in form and function to subassembly 50 as described with referenced to FIGS. 17-19.

Referring to FIGS. 3-6, rail clamp assembly 100 includes a mounting base 102, a pair of clamp members 200, and a pair of screws 300. Referring to FIGS. 3-9, mounting base 102 is defined by an anterior end 20 oppositely situated to a posterior end 22 and by a proximal side 24 oppositely situated to a distal side 26.

Figure 7:
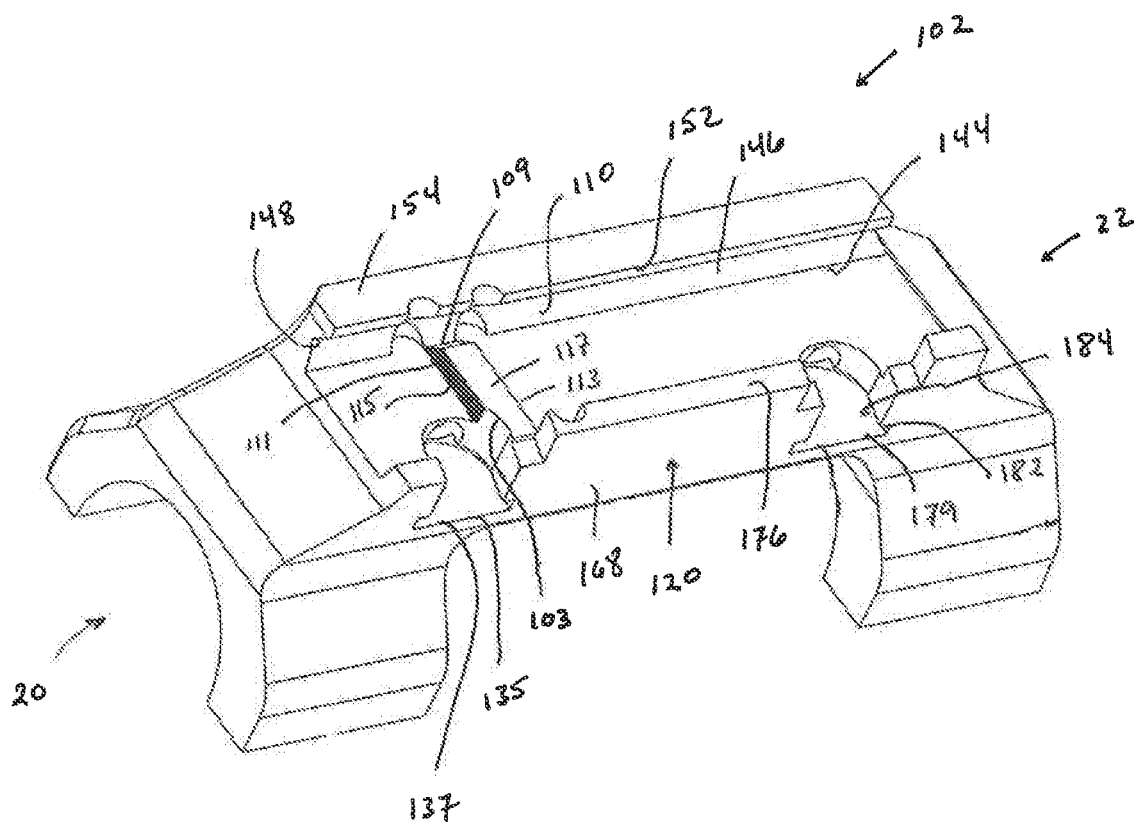
FIG. 7 is a schematic depicting an elevational view of a proximal side of a top side of an exemplary mounting base.
Figure 8:
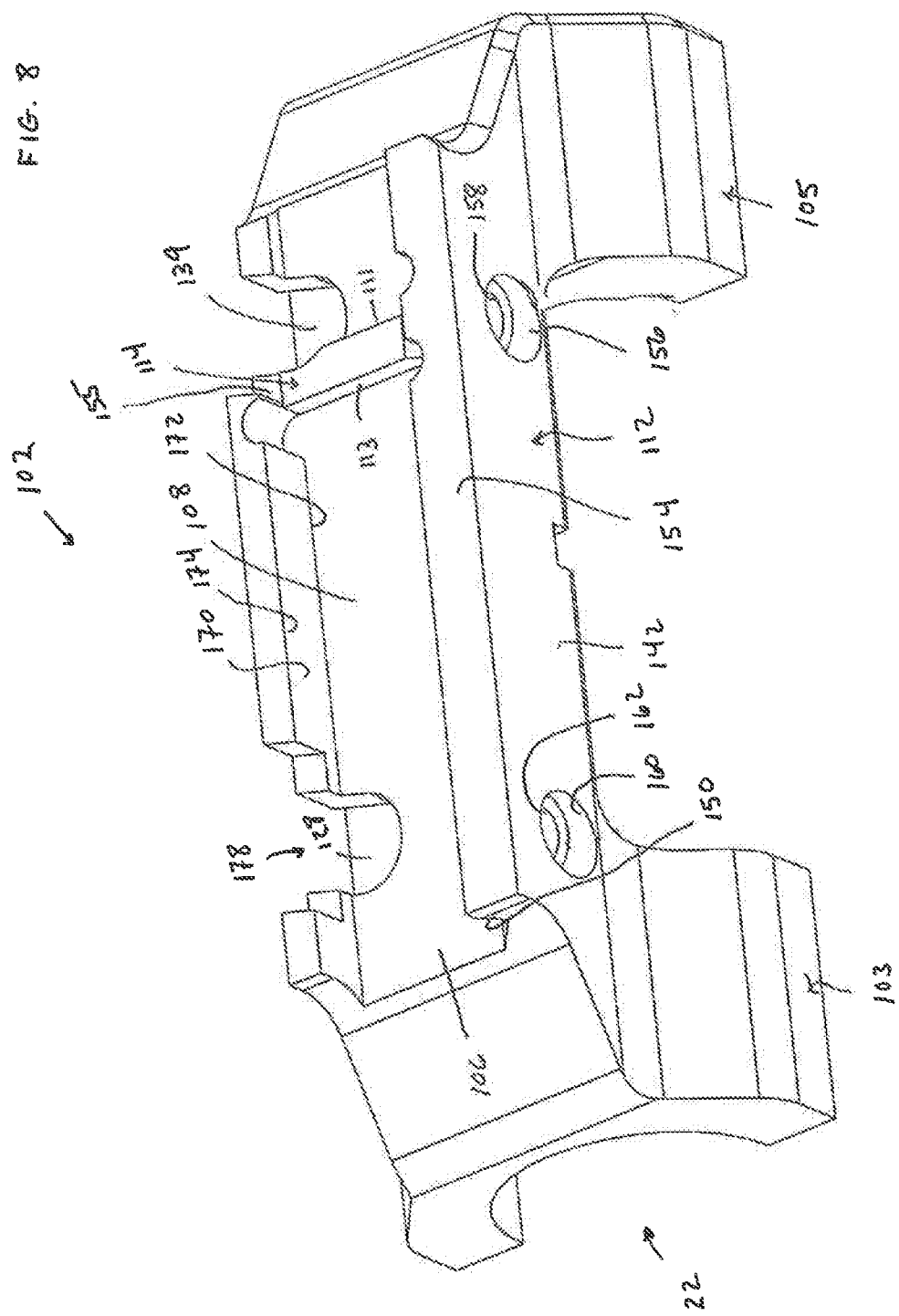
FIG. 8 is a schematic depicting an elevational view of a distal side of a top side of the mounting base depicted in FIG. 7.
Figure 9:
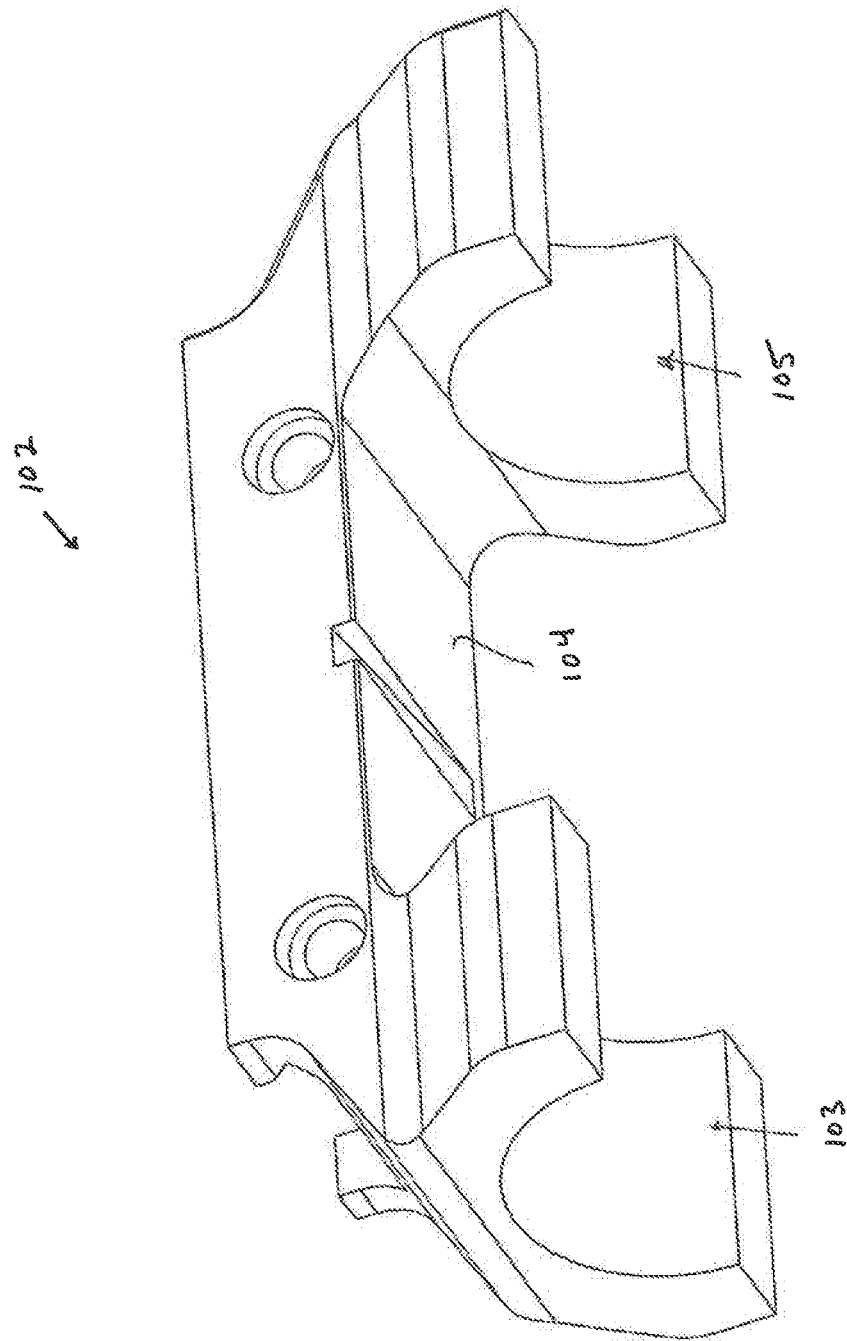
FIG. 9 is a schematic depicting an elevational view of a bottom side of the mounting base depicted in FIGS. 7 and 8.

Referring primarily to FIGS. 7-9, mounting base 102 includes an upper surface 104. Upper surface 104 may have one or more apertures, which are preferably tapped or internally threaded openings for securing an accessory or device (not shown) to upper surface 104 for removable mounting on an interface of tactical rail 10 using rail clamp assembly 100. In an exemplary embodiment, mounting base 102 comprises an arcuate shaped arm 103 and an arcuate shaped arm 105, wherein arm 103 is oppositely situated to arm 105, and wherein arms 103 and 105 are contiguously formed with and extend from upper surface 104.

Mounting base 102 defines an axial channel 106 defined by an inner surface 108 opposite upper surface 104. Axial channel 106 is further defined by a longitudinally extending distal side wall 112 and by a longitudinally extending proximal side wall 120, each of mounting base 102.

Distal side wall 112 comprises a longitudinally extending exterior face 142 oppositely situated to a longitudinally extending interior face 110. Interior face 110 comprises a longitudinally extending upper terminal edge 144 which is contiguously formed with inner surface 108 and which extends at an obtuse angle therefrom to form a longitudinally extending upper portion 146 which terminates at a lower terminal edge 148, wherein lower terminal edge 148 is substantially parallel to upper terminal edge 144. Lower terminal edge 148 slopes from upper terminal edge 144 in a direction opposite from inner surface 108 to form a longitudinally extending lower portion 150. At a terminal edge thereof, lower portion 150 turns in a direction opposite to inner surface 108 to form a longitudinally extending interior directed side wall 152. Side wall 152 turns substantially perpendicularly in a direction away from inner surface 108 to form a longitudinally extending distal lower wall 154.

Distal lower wall 154 turns substantially perpendicularly towards inner surface 108 to form exterior face 142.

Figure 14:
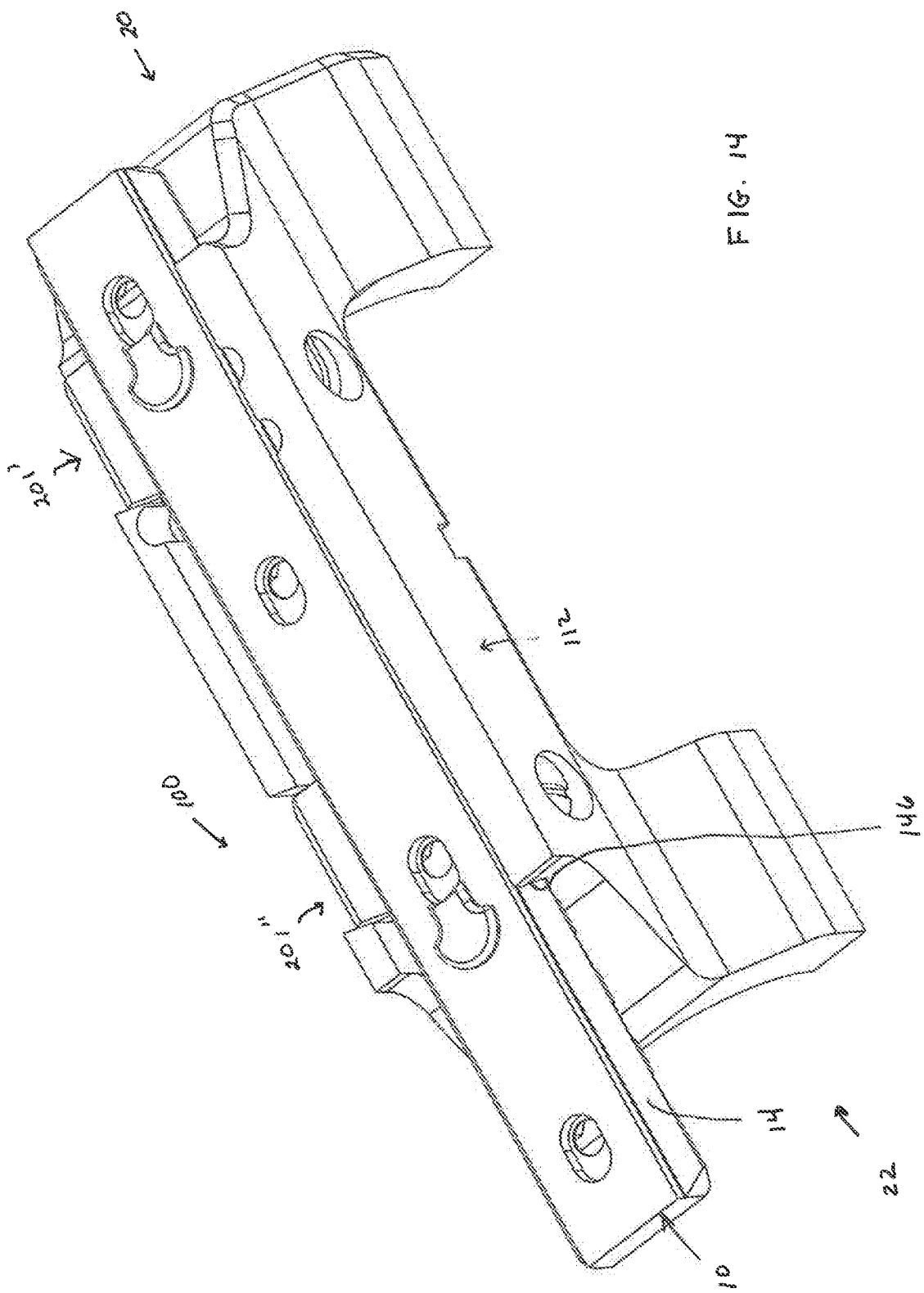
FIG. 14 is a schematic depicting an elevational view of a distal side of the rail clamp assembly depicted in FIG. 5 attached to the rail depicted in FIG. 13.

As shown in FIGS. 2 and 14, e.g., longitudinally extending upper portion 146 of distal side wall 112 engages lower distal inclined surface 14 of tactical rail 10 which is in aligned and facing contacting relation when rail clamp assembly 100 is attached to tactical rail 10.

As shown, e.g., in FIGS. 8 and 9, anterior directed openings 156 and 158 are formed through respective interior and exterior faces 110 and 142 and posterior directed openings 160 and 162 are formed through respective interior and exterior faces 110 and 142.

Still referring primarily to FIGS. 7-9, e.g., proximal side wall 120 comprises a longitudinally extending exterior face 168 oppositely situated to a longitudinally extending interior face 170. Interior face 170 comprises a longitudinally extending upper terminal edge 172 which is contiguously formed with inner surface 108 and which extends therefrom at an approximately perpendicular angle. Interior face 170 further comprises a longitudinally extending lower terminal edge 174 which is oppositely formed from upper terminal edge 172. Lower terminal edge 174 turns substantially perpendicularly away from inner surface 108 to form a longitudinally extending proximal lower wall 176 which is substantially parallel to longitudinally extending distal lower wall 154. Proximal lower wall 176 turns substantially perpendicularly towards inner surface 108 to form exterior face 168.

As shown, e.g., in FIGS. 7-9, towards posterior end 22 of mounting base 102, an opening 178 is formed through a portion of proximal side wall 120 to form a slot 179 through exterior and interior faces 168 and 170. Slot 179 leads into an intermediate surface 128 which is disposed between inner surface 108 and upper surface 104 and is formed substantially parallel therewith. As shown, e.g., in FIG. 11, slot 179 is bordered by a terminal edge 129 which is contiguously formed with proximal side wall 120 and intermediate surface 128. At an anterior end thereof, terminal edge 129 turns substantially perpendicularly towards inner surface 108 to form a first posterior directed interior wall 180. First posterior directed interior wall 180 extends therefrom and turns substantially perpendicularly towards posterior end 22 of mounting base 102 to form a buttress wall 182. Buttress wall 182 turns substantially perpendicularly away from intermediate surface 128 to form an upper posterior directed intermediate wall 184 which in turn turns substantially perpendicularly towards anterior end 20 of mounting base 102 to form a step 185. Step 185 turns substantially perpendicularly at a terminal edge thereof in a direction away from intermediate surface 128 to form a lower posterior directed intermediate wall 186 which is substantially perpendicularly joined to and contiguously formed with proximal lower wall 176.

At a posterior end of terminal edge 129, terminal edge 129 turns substantially perpendicularly towards inner surface 108 to form a second posterior directed interior wall 188, wherein second posterior directed interior wall 188 faces first posterior directed interior wall 180 and is separated therefrom by slot 179. Second posterior directed interior wall 188 extends from terminal edge 129 and turns substantially perpendicularly towards anterior end 20 of mounting base 102 to form a buttress wall 190. Buttress wall 190 turns substantially perpendicularly away from intermediate surface 128 to form an upper posterior directed intermediate wall 192 which in turn turns substantially perpendicularly towards posterior end 22 of mounting base 102 to form a step 194, wherein step 194 faces and is parallel to step 185, and further wherein intermediate wall 192 faces and is parallel to intermediate wall 184 and is separated therefrom by slot 179. Step 194 turns substantially perpendicularly at a terminal edge thereof in a direction away from intermediate surface 128 to form a lower posterior directed intermediate wall 196 which is substantially perpendicularly joined to and contiguously formed with proximal lower wall 176, and further wherein intermediate wall 196 faces and is parallel with intermediate wall 186.

Intermediate surface 128 is further bordered by a generally concave shaped abutment wall 130 that is contiguously formed with and joined to intermediate surface 128 and inner surface 108. An opening 132 is formed through abutment wall 130. A channel 133 is diagonally formed between and is in fluid communication with opening 132 of abutment wall 130 and with opening 162 of distal side wall 112.

Still referring generally to FIGS. 7-9, towards anterior end 20 of mounting base 102, an opening 135 is formed through a portion of proximal side wall 120 to form a slot 137 through exterior and interior faces 168 and 170. Slot 137 leads into an intermediate surface 139 which is disposed between inner surface 108 and upper surface 104 and is formed substantially parallel therewith, and further wherein intermediate surface 139 is coplanar with intermediate surface 128.

Figure 10:
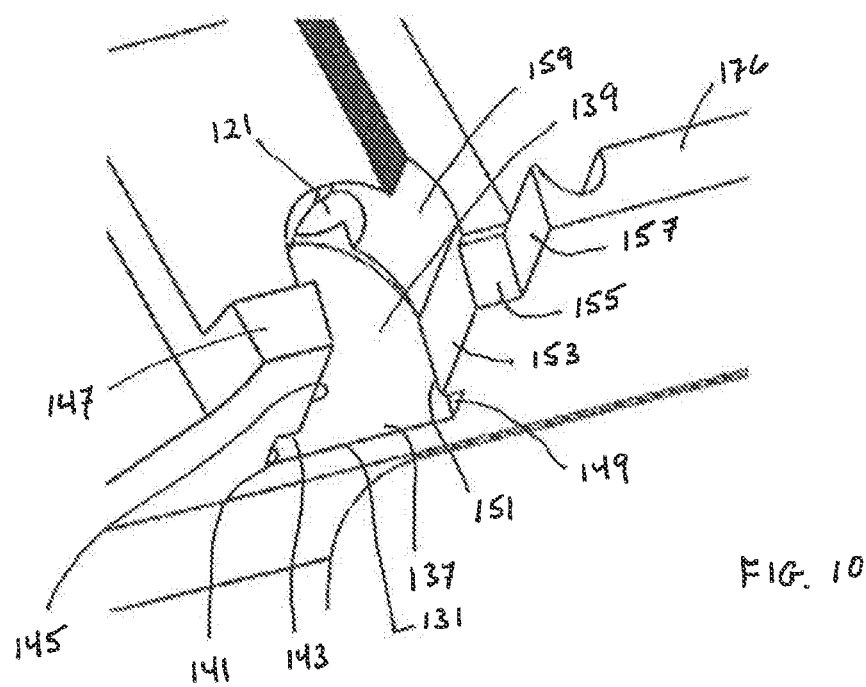
FIG. 10 is a schematic depicting an enlarged view of the anterior side of the proximal side wall depicted in FIG. 7.

As shown, e.g., in FIG. 10, slot 137 is bordered by a terminal edge 131 which is contiguously formed with proximal side wall 120 and intermediate surface 139. At an anterior end of terminal edge 131, terminal edge 131 turns substantially perpendicularly towards inner surface 108 to form a first anterior directed interior wall 141. First anterior directed interior wall 141 extends therefrom and turns substantially perpendicularly towards posterior end 22 of mounting base 102 to form a buttress wall 143. Buttress wall 143 turns substantially perpendicularly away from intermediate surface 139 to form an upper anterior directed intermediate wall 145 which in turn turns substantially perpendicularly towards anterior end 20 of mounting base 102 to form a step 147, wherein step 147 is substantially co-axially formed with lower wall 176 and is recessed relative thereto.

At a posterior end of terminal edge 131, terminal edge 131 turns substantially perpendicularly towards inner surface 108 to form a second anterior directed interior wall 149, wherein second anterior directed interior wall 149 faces first anterior directed interior wall 141 and is separated therefrom by slot 137. Second anterior directed interior wall 149 extends from terminal edge 131 and turns substantially perpendicularly towards anterior end 20 of mounting base 102 to form a buttress wall 151, wherein buttress wall 151 faces buttress wall 143 and is separated therefrom by slot 137. Buttress wall 151 turns substantially perpendicularly away from intermediate surface 139 to form an upper anterior directed intermediate wall 153, wherein intermediate wall 153 faces and is substantially parallel to intermediate wall 145. Intermediate wall 153 turns substantially perpendicularly towards posterior end 22 of mounting base 102 to form a step 155, wherein step 155 is recessed relative to step 147. Step 155 turns substantially perpendicularly at a terminal edge thereof in a direction away from intermediate surface 139 to form a lower anterior directed intermediate wall 157 which is substantially perpendicularly joined to and contiguously formed with proximal lower wall 176.

Intermediate surface 139 is further bordered by a generally concave shaped abutment wall 159 that is contiguously formed with and joined to intermediate surface 139 and inner surface 108. An opening 121 is formed through abutment wall 159. A channel 119 is diagonally formed between and is in fluid communication with opening 121 of abutment wall 159 and with opening 158 of distal side wall 112.

As shown, e.g., in FIGS. 8 and 9, anterior directed openings 156 and 158 are formed through respective interior and exterior faces 110 and 142 and posterior directed openings 160 and 162 are formed through respective interior and exterior faces 110 and 142, wherein openings 156 and 158 are in fluid communication with channel 119, and openings 160 and 162 are in fluid communication with channel 133.

Mounting base 102 further comprises a protrusion 114 formed on inner surface 108. Protrusion 114 has a bottom side 117 oppositely situated to a top side 115, and an anterior directed lateral side 111 oppositely situated to a posterior directed lateral side 113. Top side 115 is contiguously formed with inner surface 108. A terminal edge 109 of top side 115 is contiguously formed with upper terminal edge 144 of distal side wall 112. An oppositely situated terminal edge 107 of top side 115 is contiguously formed with step 155, and a portion of anterior directed lateral side 111 has as its border a terminal edge 103 of abutment wall 159. Protrusion 114 is sized to be received within one of a series of slots 20 located on top side 18 of tactical rail 10 to prevent axial movement of rail clamp assembly 100 relative to tactical rail 10, e.g., due to recoil of the firearm when a round is fired.

Figure 12:
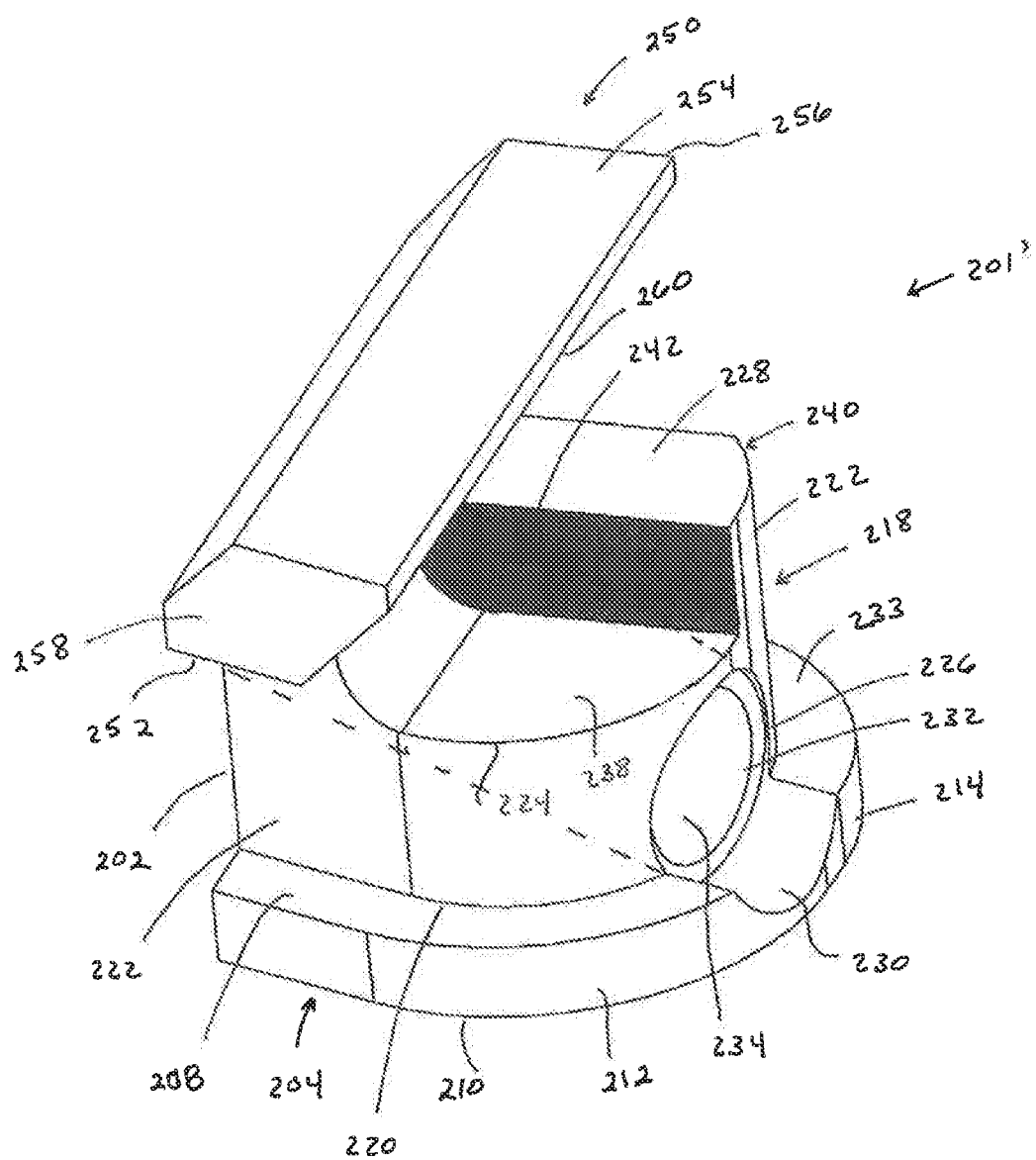
FIG. 12 is a schematic depicting an exemplary clamp member.
Figure 13:
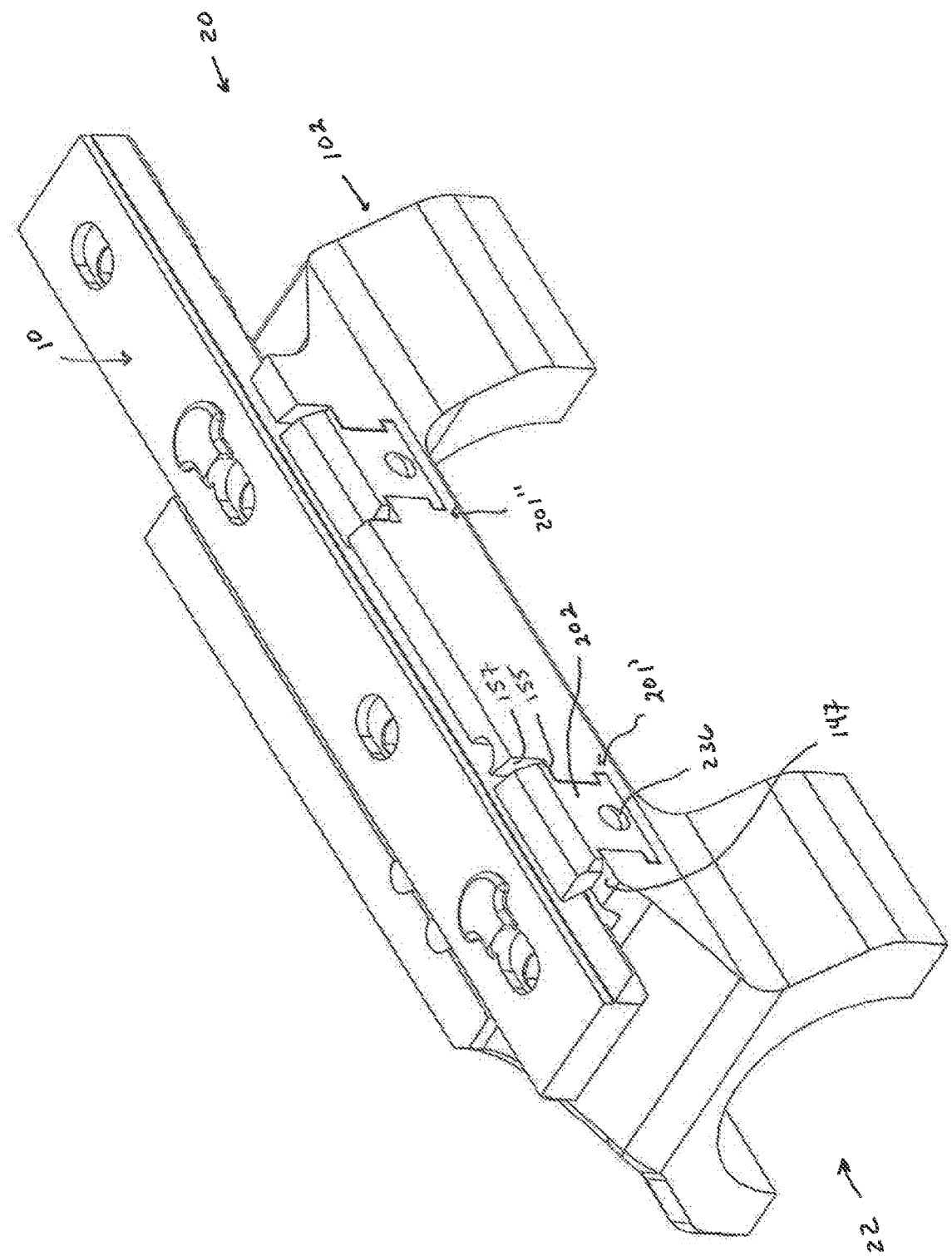
FIG. 13 is a schematic depicting an elevational view of a proximal side of the rail clamp assembly depicted in FIG. 3 attached to an exemplary rail.

Referring to FIGS. 12 and 14, e.g., pair of clamp members 200 includes clamp members 201' and 201". As clamp members 201' and 201" are identical, clamp member 201' is specifically described with reference to FIG. 12. It is understood, however, that such description is equally applicable to clamp member 201"

Figure 11:
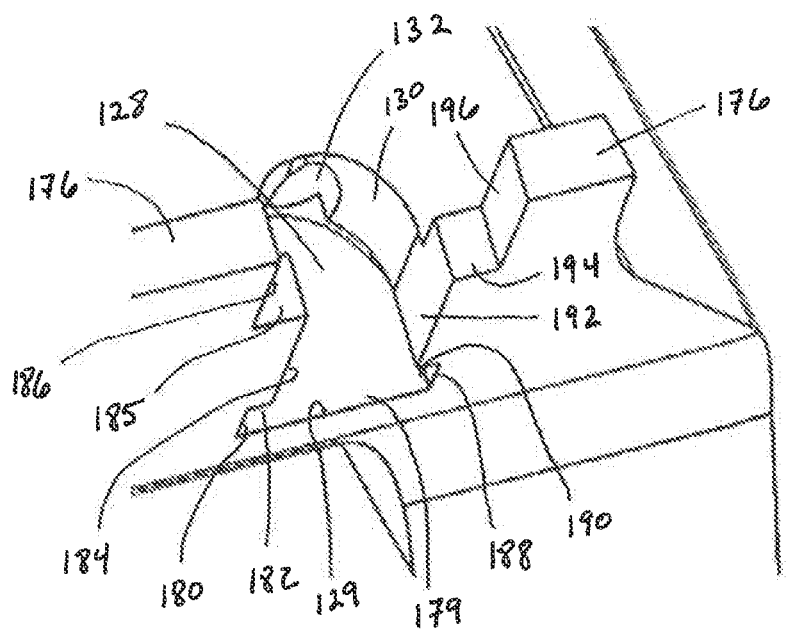
FIG. 11 is a schematic depicting an enlarged view of the posterior side of the proximal side wall depicted in FIG. 7.

As shown, e.g., in FIG. 11, clamp member 201' comprises a proximal directed face 202 which has a generally I-shaped configuration. Clamp member 201' further comprises a foot member 204. Foot member 204 comprises a bottom side 208 oppositely situated to a top side 210, each of which is contiguously formed with proximal directed face 202. Foot member 204 further comprises a generally convex-shaped side wall 212 which is transversely and contiguously formed with bottom and top sides 208 and 210. Side wall 212 comprises an apex end 214 which is opposed to face 202.

Clamp member 201' further comprises a base member 218. Base member 218 is contiguously formed with and extends from face 202. Base member 218 comprises a generally convex shaped upper terminal edge 220 that extends from face 202 and that is contiguously formed with bottom side 208. Terminal edge 220 extends substantially perpendicularly from bottom side 208 to form a generally convex-shaped side body 222 which terminates at a lower terminal edge 224. Body 222 is recessed relative to foot member 204, thereby creating a shelf region 233. An apex 226 of side body 222 is directed towards and aligned with apex 214, and further wherein apex 226 is opposed to face 202. Lower terminal edge 224 turns substantially perpendicularly inwards to form a lower wall 228 of base member 218.

An indent 230 is formed through apex 214 of side wall 212. Indent 230 leads into an opening 232 which is formed at apex 226 of side body 222. Opening 232 is in fluid communication with a throughway 234 that is formed through side body 222 and which is in fluid communication with an opening 236 that is formed through face 202.

A groove is formed through lower wall 228 to form a generally concave-shaped recessed wall 238 and a protrusion 240. Protrusion 240 is defined by lower wall 228, side body 222, face 202, and by an interior-directed side wall 242 that is contiguously formed with generally concave-shaped recessed wall 238.

Clamp member 201' further comprises a flange 250 having an upper side 252 oppositely situated to a lower side 254, wherein upper side 252 is contiguously formed with face 202 such that flange 250 is directed towards and extends over lower wall 228 of base member 218 such that an anterior end 256 and a posterior end 258 of flange 250 extends past lower terminal edge 224. Flange 250 of clamp member 201' further comprises a distal inclined surface 260 disposed between upper side 252 and lower side 254, wherein distal inclined surface 260 is directed towards apex 214 of foot member 204.

As shown, e.g., in FIGS. 4, 6, 15, and 16, rail clamp assembly 100 further comprises a screw 300 and 300', wherein screws 300 and 300' are identical to one another. Each of screws 300 and 300' respectively has a shaft 302 and 302' oppositely situated to a respective head 304 and 304'.

Figure 15:
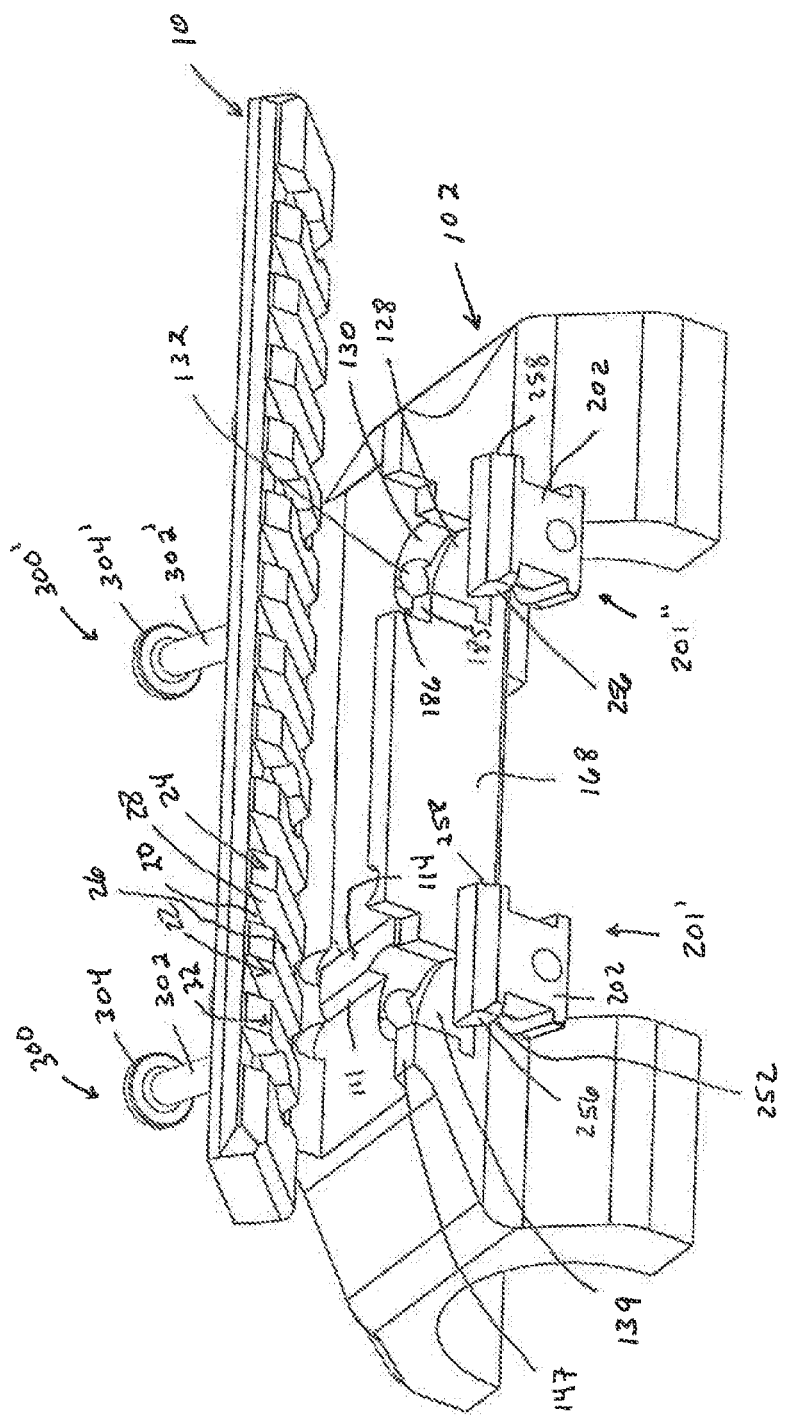
FIG. 15 is a schematic depicting an exploded top side view of the rail clamp assembly and the rail depicted in FIG. 13.
Figure 16:
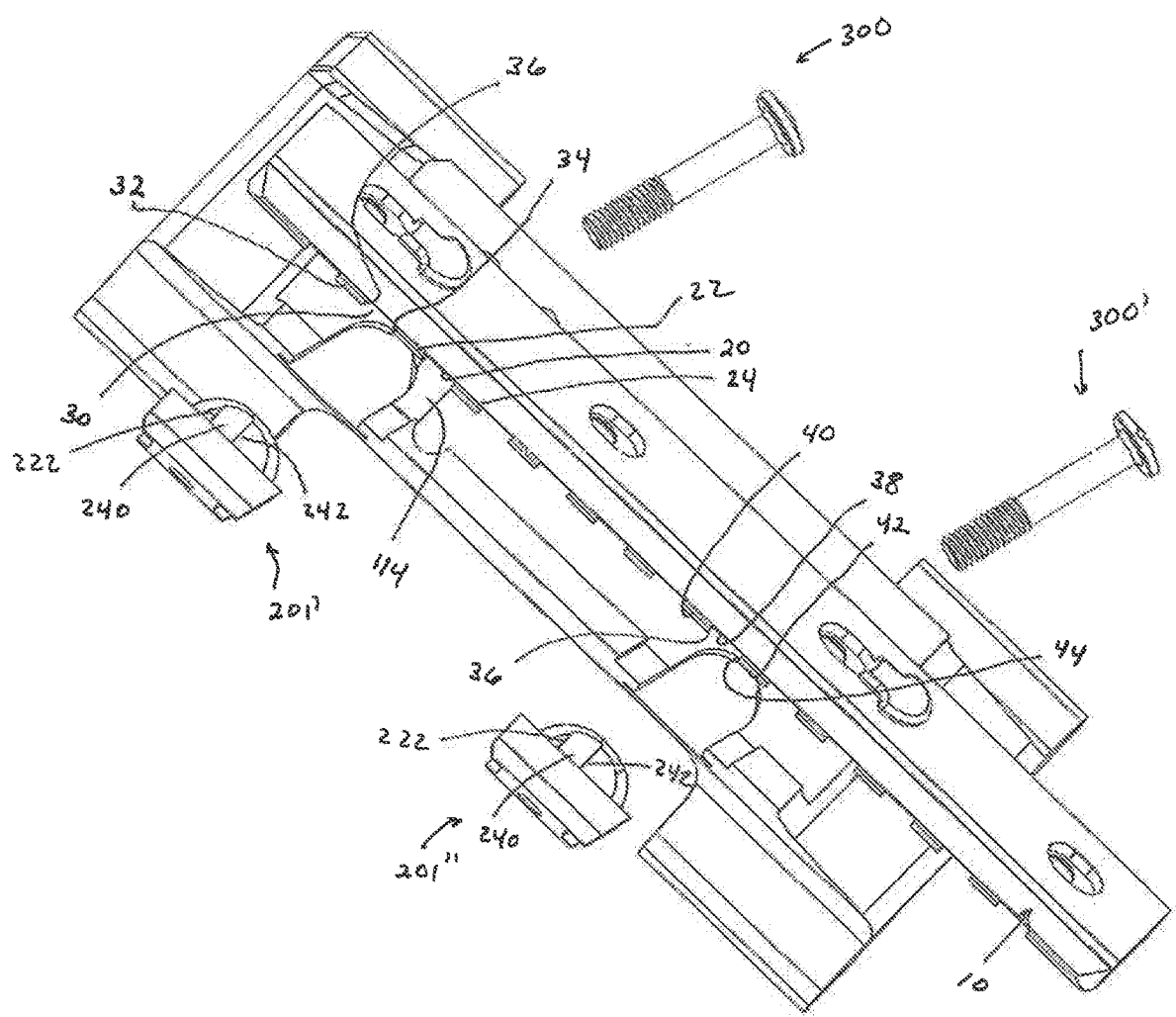
FIG. 16 is a schematic depicting an exploded elevational view of the proximal side of the rail clamp assembly and the rail depicted in FIG. 13

As best shown, e.g., in FIGS. 15 and 16, clamp member 201' is engaged with mounting base 102 such that foot member 204 of clamp member 201' is received within slot 137 of proximal side wall 120, such that top side 210 of clamp member 201' is disposed on intermediate surface 139 of mounting base 102, side wall 212 of foot member 204 of clamp member 201' abuts abutment wall 159 of mounting base 102, such that throughway 234 of clamp member 201' is aligned and in communication with opening 121 of mounting base 102, such that proximal directed face 202 of clamp member 201' is substantially flush with exterior face 168 of proximal side wall 24 of mounting base 102, such that upper side 252 of flange 250 of clamp member 201' physically abuts step 155, and posterior end 258 of flange 250 of clamp member 201' abuts lower anterior directed intermediate wall 157, such that upper side 252 of flange 250 of clamp member 201' physically abuts step 147 of mounting base 102, and such that lower side 254 of flange 250 of clamp member 201' is recessed relative to proximal lower wall 176 of mounting base 102.

Clamp member 201" is engaged with mounting base 102 such that foot member 204 of clamp member 201" is received within slot 179 of proximal side wall 120, such that top side 210 of clamp member 201" is disposed on intermediate surface 128 of mounting base 102, side wall 212 of foot member 204 of clamp member 201" abuts abutment wall 130 of mounting base 102, such that throughway 234 of clamp member 201" is aligned and in communication with opening 132 of mounting base 102, such that proximal directed face 202 of clamp member 201" is substantially flush with exterior face 168 of mounting base 102, such that upper side 252 of flange 250 of clamp member 201" physically abuts step 185 and anterior end 256 of flange 250 of clamp member 201" abuts lower posterior directed intermediate wall 186, such that upper side 252 of flange 250 of clamp member 201' physically abuts step 194 of mounting base 102 and posterior end 258 of flange 250 of clamp member 201" abuts lower posterior directed intermediate wall 196 of mounting base 102, and such that lower side 254 of flange 250 of clamp member 201" is recessed relative to proximal lower wall 176 of mounting base 102.

Screws 300 and 300' are used to respectively secure clamp members 201' and 201" to mounting base 102. Shaft 302 is received through openings 160 and 162, opening 121, and channel 119 of mounting base 102 and though openings 232 and 326 and throughway 234 of clamp member 200'. Similarly, shaft 302' is received through openings 156 and 158, opening 132, and channel 133 of mounting base 102 and though openings 232 and 236 and throughway 234 of clamp member 201".

Clamp members 201' and 201" may be removed from mounting base 102 by disengaging screws 300 and 300' from respective clamp members 201' and 201" and by sliding clamp members 201' and 201" away from mounting base 102.

As shown, e.g., in FIGS. 11-14, an exemplary method for installing rail clamp assembly 100 onto tactical rail 10 includes positioning protrusion 114 within a slot 20 of tactical rail 10, wherein slot 20 is formed between a rib 22 and a rib 24 of tactical rail 10 such that a lateral side 26 physically abuts anterior directed lateral side 111 of protrusion 114 and a lateral side 28 of rib 24 physically abuts posterior directed lateral side 113 of protrusion 114. Additionally, when installing rail clamp assembly 100 onto tactical rail 10, protrusion 240 of clamp member 201' is disposed within a slot 30 of tactical rail 10, wherein slot 30 is disposed between rib 22 and a rib 32, and such that side wall 242 of protrusion 240 of clamp member 201' physically abuts a lateral wall 34 of rib 22 and side body 222 of protrusion 240 of clamp member 201' physically abuts a lateral wall 36 of rib 32.

Additionally, protrusion 240 of clamp member 201" is disposed within a slot 38 of tactical rail 10, wherein slot 38 is disposed between a rib 40 and a rib 42, and such that side wall 242 of protrusion 240 of clamp member 201" physically abuts a lateral wall 44 of rib 42 and side body 222 of protrusion 240 of clamp member 201" physically abuts a lateral wall 36 of rib 40.

Screws 300 and 300' may then be secured to mounting base 102 and to respective clamp members 201' and 201" by inserting them through the respective openings and channels as previously disclosed herein.

Once installed, distal inclined surfaces 260 of flanges 250 of clamp members 201' and 201" physically rests on lower proximal inclined surface 16 of rail 10.

As appreciated by the disclosure herein, when tactical rail 10 is installed onto rail clamp assembly 100, clamp member 201" is forced against lateral wall 44 of rib 42 thereby causing a tensional force on rail 10 by pushing against lateral wall 44 of rib 42 in a direction away from clamp member 201', while clamp member 201' exerts a compressive force on rib 22 which also has an oppositely directed force being asserted against it by protrusion 114. This, then, creates a three-slot system that uses three slots of the rail to increase the angle of the screw, thereby proportionately increasing the front back clamping force as compared to conventionally known clamping systems.

It is noted that although the embodiments depicted herein include assemblies comprising one or more clamp member/mounting base subassemblies, any and all of the embodiments disclosed herein may include one or more of the one or more subassemblies described herein and may further include variations to those subassemblies as would be apparent to one of ordinary skill in the art reading the present disclosure. Therefore, although the invention has been described with reference to preferred embodiments, modifications and alterations will occur to others upon a reading and understanding of the preceding disclosure herein, whereby it is to be distinctly understood that the foregoing descriptive matter is to be interpreted merely as illustrative of the invention and not as a limitation.

What is claimed is:

1. A rail clamp assembly which attaches to a tactical rail for a firearm, wherein the rail comprises a first rib located adjacent to a first slot and a second slot, and a second rib located adjacent to the second slot and a third slot, and further wherein the rail comprises a proximal side oppositely situated to a distal side, wherein the first, second, and third slots, and the first and second rib are positioned between and transversely to the proximal and distal sides of the rail, wherein the assembly comprises:
   a mounting base comprising:
      a plate having an inner surface, a proximal side wall integrally formed on a first terminal edge of the inner surface and a distal side wall integrally formed on a second terminal edge, wherein the first terminal edge is oppositely situated from the second terminal edge, and further wherein a throughole is formed through the inner surface wherein the throughole diagonally extends from the proximal side wall to the distal side wall, and further wherein a protrusion is formed on the inner surface;
   a clamp member comprising:
      a body having a distal end oppositely situated to a proximal end, wherein a diagonally formed throughole is formed through the body and extends from the proximal end to the distal end, and further wherein a protrusion is formed on and extends from the body;
      a front face substantially perpendicularly and contiguously formed with the proximal end of the body of the clamp member; and
      a flange which is contiguously formed with the front face and which overhangs the body of the clamp member; and
   a screw having a head and a shaft, wherein the shaft longitudinally extends from the head;
   wherein the shaft of the screw extends through the throughholes of the mounting base and the clamp member such that the head is directed towards the distal side wall of the mounting base, and such that the protrusion of the clamp member is fitted within the first slot of the rail, the protrusion of the clamp member is fitted within the second slot of the rail, and such that the flange engages with the proximal side of the rail.

2. The rail clamp assembly of claim 1, wherein the throughole comprises an elliptical configuration.

3. The rail clamp assembly of claim 2, wherein the protrusion of the mounting base has a terminal edge that is contiguously formed with the throughole of the mounting base.

4. A rail clamp assembly which attaches to a tactical rail for a firearm, wherein the tactical rail comprises a longitudinally extending body having a top side oppositely situated to a bottom side, a proximal inclined surface which joins the top side to the bottom side at proximal sides of the top and bottom sides, and a distal inclined surface that joins the top side to the bottom side at distal sides of the top and bottom sides, and wherein a series of ribs and alternating slots are formed on the top side of the rail, wherein the rail clamp assembly comprises:
   a mounting base comprising:
      a longitudinally extending inner surface oppositely situated to a longitudinally extending upper surface wherein each of the inner and upper surfaces has a first terminal end oppositely situated to a second terminal end;
      a longitudinally extending distal side wall contiguously and transversely formed with the first terminal ends, wherein the distal side wall has a rail gripping portion that extends from and overhangs the inner surface, wherein the rail gripping portion is configured to receive the distal inclined surface of the rail, and further wherein the distal side wall comprises a first opening and a second opening, wherein each of the first and the second openings are formed through the distal side wall at a position between the inner surface and the upper surface; and a longitudinally extending proximal side wall contiguously and transversely formed with the second terminal ends of the upper surface and the inner surface, wherein the proximal side wall is oppositely formed to the distal side wall;

a first and a second slot, wherein each of the first and second slots are formed through the proximal side wall and extend through the inner surface to respectively form a first intermediate wall and a second intermediate wall and a first abutment wall and a second abutment wall, wherein the first and the second intermediate walls are disposed between the inner surface and the upper surface and are substantially parallel thereto, and wherein the first and the second abutment walls are respectively contiguously formed with and located transversely to the first and the second intermediate walls and are contiguously formed with and located transversely to the inner surface, and further wherein the first and the second abutment walls respectively has a first and a second opening formed thereon;

a first and a second diagonally formed channel each of which is formed between the inner surface and the upper surface, wherein the first channel is in fluid communication with the first opening of the first abutment wall and with the first opening of the distal side wall, and the second channel is in fluid communication with the second opening of the second abutment wall and with the second opening of the distal side wall; and a protrusion formed on the inner surface and located adjacently to the first slot;

a first clamp member and a second clamp member, wherein each of the first and the second clamp members comprises:

a proximal directed face comprising a first lateral side wall oppositely situated to a second lateral side wall and a lower edge oppositely situated to an upper edge;

a side body contiguously formed with and transversely located to the first and the second lateral walls of the proximal directed face;

a lower wall contiguously formed with and transversely located to the lower edge of the proximal directed face, wherein a groove is formed through the lower wall of the respective first and second clamp members, to form a protrusion which is bordered by a recessed wall; and a throughway diagonally formed through the side body, wherein the throughway extends from an opening formed on the side body of the clamp member and through an opening formed through the proximal directed face;

wherein, when the rail is attached to the rail clamp assembly, the first clamp member is positioned within the first slot of the mounting base and the second clamp member is positioned within the second slot of the mounting base such that the opening on the side wall of the first clamp member is aligned with the first opening of the distal side wall and the opening on the side body of the second clamp member is aligned with the second opening of the distal side wall, and wherein the protrusion of the first clamp member is positioned within a slot of the rail.

5. The rail clamp assembly of claim 4, wherein the first slot formed in the proximal side wall of the mounting base is bordered by a first terminal edge which joins the proximal side wall to the first intermediate surface and which is contiguously formed with the proximal side wall and the first intermediate surface, wherein:

the first terminal edge turns substantially perpendicularly away from the inner surface at an anterior end thereof to form a first anterior directed interior wall which extends and turns substantially perpendicularly therefrom towards a posterior end of the first terminal edge of the first intermediate surface to form a first buttress wall which extends and turns substantially perpendicularly away from the inner surface to form a first upper anterior directed intermediate wall, which extends and turns substantially perpendicularly therefrom to form a first step; and further wherein the first terminal edge of the first intermediate surface turns substantially perpendicularly away from the inner surface at the posterior end thereof to form a second anterior directed interior wall, which extends and turns substantially perpendicularly therefrom towards the first buttress wall to form a second buttress wall, which extends therefrom and turns substantially perpendicularly away from the inner surface to form a second upper anterior directed intermediate wall, which extends and turns substantially perpendicularly away from the first step to form a second step, which extends and turns substantially perpendicularly away from the inner surface to form a lower anterior directed intermediate wall which extends and turns substantially perpendicularly therefrom to form a first proximal lower wall.

6. The rail clamp assembly of claim 5, wherein the first clamp member further comprises a foot member that extends from and is contiguously formed with the proximal directed face of the first clamp member, wherein the foot member is contiguously formed with the side body of the first clamp member at an upper terminal edge of the side wall, wherein the upper terminal edge of the side body is oppositely situated from the lower wall of the first clamp member, and further wherein the side body of the first clamp member is recessed relative to the foot member to thereby form a shelf region of the foot member, wherein the shelf region turns substantially perpendicularly away from the side body of the first clamp member to form a side wall of the foot member, wherein the side wall of the foot member of the first clamp is contiguously formed with and transversely located to a top side of the foot member which is oppositely formed to the shelf region, wherein when the first clamp member is engaged with the mounting base, the top side of the foot member physically abuts the first intermediate surface, the shelf region physically abuts the first and the second buttress walls of the first clamp member, the side wall of the foot member of the first clamp member physically abuts the first and the second anterior directed interior wall and the first abutment wall, and the side body of the first clamp member physically abuts the first and the second upper anterior directed intermediate walls which form the boundaries of the first slot.

7. The rail clamp assembly of claim 6, wherein the first clamp member further comprises a longitudinally extending flange having an upper side oppositely situated to a lower side, an anterior end oppositely situated to a posterior end, and an inclined distal side oppositely directed from the proximal directed face of the first clamp member wherein the upper side of the flange is directed over the lower wall of the clamp member and further wherein, when the first clamp member is engaged with the mounting base, the upper side of the flange rests on the first step of the first flange and the posterior end of the flange physically abuts the lower anterior directed intermediate wall, and further wherein, when the rail is secured to the rail clamp assembly, the inclined distal side of the flange of the first clamp member rests on the distal inclined surface of the rail.

8. The rail clamp assembly of claim 7, wherein the second slot formed in the proximal side wall of the mounting base is bordered by a second terminal edge which joins the proximal side wall to the second intermediate surface and which is contiguously formed with the proximal side wall and with the second intermediate surface, wherein:

the second terminal edge of the second intermediate surface turns substantially perpendicularly away from the inner surface at an anterior end thereof to form a first posterior directed interior wall which extends and turns substantially perpendicularly therefrom towards a posterior end of the second terminal edge of the second intermediate surface to form a first buttress wall which extends and turns substantially perpendicularly away from the inner surface to form a first upper posterior directed intermediate wall, which extends and turns substantially perpendicularly therefrom towards the first slot to form a first step which extends therefrom and substantially perpendicularly turns away from the inner surface to form a lower posterior directed intermediate wall, which extends therefrom and turns substantially perpendicularly therefrom to form the proximal lateral wall; and further wherein the second terminal edge of the second intermediate surface turns substantially perpendicularly away from the inner surface at the posterior end thereof to form a second anterior directed interior wall, which extends and turns substantially perpendicularly therefrom towards the first buttress wall to form a second buttress wall, which extends therefrom and turns substantially perpendicularly away from the inner surface to form a second upper posterior directed intermediate wall, which extends and turns substantially perpendicularly away from the second buttress wall to form a second step, which extends therefrom and turns substantially perpendicularly away from the first lower posterior directed intermediate wall to form a second proximal lower wall.

9. The rail clamp assembly of claim 8, wherein the second clamp member further comprises a foot member that extends from and is contiguously formed with the proximal directed face of the second clamp member, wherein the foot member is contiguously formed with the side wall of the second clamp member at an upper terminal edge of the side wall, wherein the upper terminal edge of the side wall is oppositely situated from the lower wall of the second clamp member, and further wherein the side wall of the second clamp member is recessed relative to the foot member to thereby form a shelf region of the foot member, wherein the shelf region turns substantially perpendicularly away from the side wall of the second clamp member to form a side wall of the foot member, wherein the side wall of the foot member of the first clamp is contiguously formed with and transversely located to a top side of the foot member which is oppositely formed to the shelf region, wherein when the second clamp member is engaged with the mounting base, the top side of the foot member physically abuts the second intermediate surface, the shelf region physically abuts the first and the second buttress walls, the side wall of the foot member physically abuts the first and the second posterior directed interior walls and the second abutment wall, and the side body of the second clamp member physically abuts the first and the second upper posterior directed intermediate wall that border the second slot.

10. The rail clamp assembly of claim 9, wherein the second clamp member further comprises a longitudinally extending flange having an upper side oppositely situated to a lower side, an anterior end oppositely situated to a posterior end, and an inclined distal side oppositely directed from the proximal directed face of the second clamp member, wherein the upper side of the flange of the second clamp member is directed over the lower wall of the second clamp member and further wherein, when the second clamp member is engaged with the mounting base, the upper side of the flange rests on the first and the second steps of the second flange, the anterior end of the flange of the second clamp member physically abuts the lower posterior directed intermediate wall that borders the second slot, and the posterior end of the flange of the second clamp member physically abuts the lower posterior directed intermediate wall that borders the second slot, and further wherein, when the rail is secured to the rail clamp assembly, the inclined distal side of the flange of the second clamp member rests on the distal inclined surface of the rail.

11. The rail clamp assembly of claim 10, further comprising a first screw and a second screw, wherein, when the rail is attached to the rail clamp assembly, the first screw is positioned through the opening formed on the proximal directed face of the first clamp member, the opening formed on the side body of the first clamp member, through the opening formed on the first abutment wall, through the first opening of the distal side wall, through the throughway of the first clamp member and through the first channel of the mounting base; and the second screw is positioned through the opening formed on the proximal directed face of the second clamp member, the opening formed on the side body of the second clamp member, through the opening formed on the second abutment wall, through the second opening of the distal side wall, through the throughway of the second clamp member and through the second channel of the mounting base.

12. A rail clamp assembly which attaches to a tactical rail for a firearm, wherein the rail comprises a first rib located adjacent to a first slot and a second slot, and a second rib located adjacent to the second slot and a third slot, and further wherein the rail comprises a proximal side oppositely situated to a distal side, wherein the first, second, and third slots, and the first and second rib are positioned between and transversely to the proximal and distal sides of the rail, wherein the assembly comprises:

a mounting base comprising:
a throughole that diagonally extends from a proximal side of a body of the mounting base to a distal side of the body of the mounting base; and
a protrusion formed on and extending from the body of the mounting base;
a clamp member comprising a body, a front face, and a flange, wherein the front face is substantially perpendicularly formed with the body, and wherein the flange is contiguously formed with and extends from the front face such that the flange overhangs the body of the clamp member, and further wherein the body has a protrusion formed thereon, and further wherein a throughole is formed through the body of the clamp member; and a screw having a shaft that longitudinally extends from a head;

wherein when the assembly is engaged with the rail, the body of the clamp member is positioned on the throughole of the mounting base such that the flange is physically engaged with the proximal side of the rail, the protrusion of the mounting base is fitted within the first slot, the protrusion of the clamp member is fitted within the second slot, and the shaft of the screw extends from the througholes of the clamp member and the mounting base such that the head of the screw is directed towards the distal side wall of the mounting base.

13. The rail clamp assembly of claim 12, wherein the throughole of the mounting base comprises an elliptical configuration.

* * * * *